Dec. 29, 1959     A. T. HUNTER     2,919,118
AIR HEATER
Filed Nov. 5, 1954
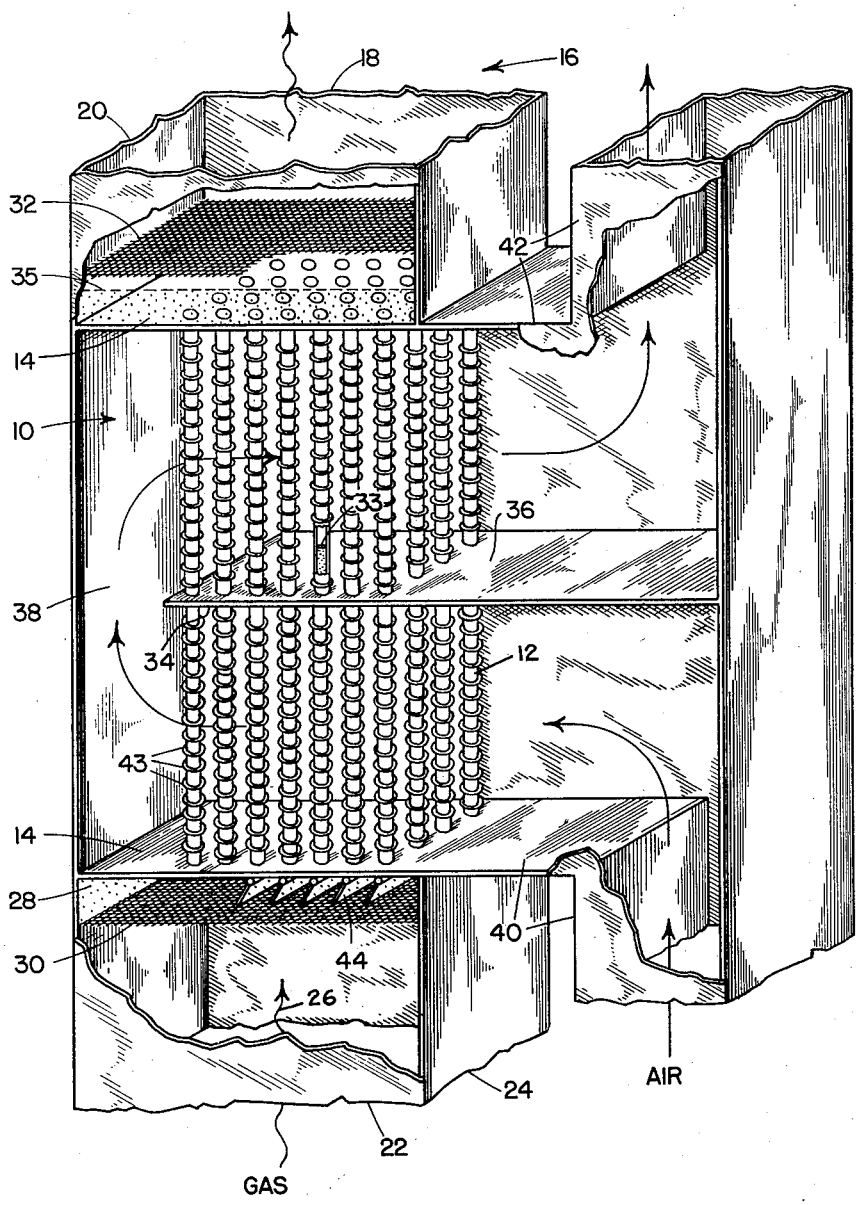
INVENTOR
ARTHUR T. HUNTER
BY
*Eldon H. Luther*
ATTORNEY

United States Patent Office 2,919,118
Patented Dec. 29, 1959

2,919,118

AIR HEATER

Arthur T. Hunter, New York, N.Y., assignor to Combustion Engineering, Inc., New York, N.Y., a corporation of Delaware Application November 5, 1954, Serial No. 467,045

1 Claim. (Cl. 257—224)

This invention relates to air heaters wherein air is heated by being passed in indirect heat exchange relation with combustion gases and has particular relation to such an air heater employing a fluidized discrete material.

In accordance with the present invention the air heater comprises a plurality of parallel spaced passageways which may be formed by means of tubes or ducts and the ends of which are connected into tube sheets and lead directly into a chamber that is bounded on one side by a screen spaced from the tube sheet. Hot combustion gases are passed through the passageways within which is positioned discrete material that is maintained in a fluidized state by this flow of gas, with the spaced screens being effective to prevent escape of the discrete material. The outer surface of each of the passageways is provided with radially extending annular fins and air is directed over the outer surface of these passageways in a direction transverse to the major axis thereof and parallel with the planes of the radial fins. With this air heater the total heat transfer from the hot combustion gases to the air is much greater than that obtainable with conventional air heaters of the same size, this result being obtained through the novel use of the fluidized medium and extended surface.

The technique of fluidization involves passing a gas through a body of discrete material at such a velocity that the body of material assumes an agitated state resembling a boiling liquid with the particles of the material moving rapidly within the mass and the mass being in what is termed a pseudo-liquid condition. When in this fluidized state the material is not carried along with the fluidizing gas and although the body of material is expanded so that it occupies considerably more volume than when in the settled or non-fluidized the gas passes through the body of material and leaves the same at the pseudo-liquid level of the mass or at what is termed a disengaging zone. This type of fluidization is sometimes referred to as "dense phase" fluidization and it is to be understood that when the term "fluidization" is used throughout this application reference is had to this type of fluidization. When a body of discrete material is in this fluidized condition or state the body of the material has many of the properties of a liquid and results in extremely high rates of heat transfer between the fluidizing gas and a heat exchange surface which is in contact with the fluidized material with these rates of heat exchange being in the order of 30 or 40 B.t.u./sq.ft./° F. and above with rates as high as 100 B.t.u./sq.ft./° F. being obtainable depending upon the make up of the discrete material and the size of the particles thereof. However, the material must be fluidized to obtain these high rates of heat transfer and if the gas velocity is either too low or too high to produce fluidization these high rates will not be realized. In the present invention such a fluidized body or mass is employed in a novel manner to greatly increase the capacity of a recuperative type heat exchanger.

The rate at which heat may be transferred from a heating gas such as hot combustion gases to a gas to be heated such as air is necessarily dependent upon and limited by the lowest rate of heat transfer of these two mediums, i.e., the heat transfer rate between the gas and the heat transfer surface or the air and the heat transfer surface whichever is lower. In the case of a gas to air heater wherein heat is transferred from hot combustion gases to air through a metallic heat transfer surface the heat transfer rate prevailing between the gas and the heat transfer surface and the air and heat transfer surface is substantially the same for the same mass flow of the two fluids and when flow conditions are alike. In the usual tubular air heater wherein combustion gases are passed through the interior of the tubes and air is passed laterally over the outer surface of the tubes the heat transfer rate prevailing between the gas and the tube wall is somewhat lower than that prevailing between the air and the tube wall. This, however, is due to the difference in flow conditions since the air flow over the outside of the tubes will be considerably more turbulent than the gas flow in the interior of the tubes.

However, regardless of whether the heat transfer rates are the same or one is slightly lower than the other it is impossible to increase the capacity of the air heater to any substantial extent by providing extended surface on only one side of the heat transfer wall for contact with one of the fluid mediums. This is so because the heat transfer rate between the fluid and the wall on the side that is not provided with extended surface will, to a large extent, control the amount of heat that will be transferred from the heating to the heated medium since this heat transfer rate is not substantially different from that prevailing between the fluid and the side that is provided with extended surface. Thus in a conventional tubular air heater there would be no substantial increase in the overall heat transfer by providing extended surface on the outer surface of the tubes since the heat transfer rate between the combustion gases and the internal surface of the tubular walls will be controlling and prevent any substantial increase in the overall heat transferred. To greatly increase the overall heat transfer in such a case it is necessary to provide extended surface within the tubes or increase the heat transfer rate between the gas and the internal wall surface of the tube. Since construction difficulties as well as probability of clogging effectively prevent, as a practical matter, the installation of extended surface within the tube, in accordance with the present invention the effective heat transfer rate between the combustion gases and the tube wall is increased by the utilization of a fluidized medium, it being known in the fluidization art that high rates of heat transfer prevail between the gaseous fluidization medium and the particles that are fluidized as well as between the particles and the heat exchange surface which they contact.

It is an object of this invention to provide an improved gas to air air heater that utilizes a fluidized medium and which has a capacity substantially greater than that of known air heaters of comparable dimensions.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing which is a perspective view of the organization with portions broken away to show the interior construction thereof.

Referring now to the drawing, wherein like reference characters designate like elements, the novel air heater shown therein comprises a tube bundle designated generally 10 and composed of numerous parallel laterally spaced tubes 12 which are connected at their opposite ends to the tube sheets 14, with the bundle being enclosed within the duct or gas pass 16 which is bounded by walls 18, 20, 22, and 24 and through which combustion gas is upwardly directed as indicated by arrow 26.

Within the tubes 12 is positioned a discrete material 28 of relatively small particle size which is capable of being fluidized within the range of gas velocity created by the flow of gas upwardly through the tubes. Spaced slightly below the lower tube sheet 14 and above the upper tube sheet 14 are the screens or foraminous members 30 and 32 respectively, with these screens being of such a mesh as to prevent the passage of the discrete material therethrough. When there is no gas flow through duct 16 the discrete material will be supported by screen 30 or the like with the upper level of the material being somewhat below the top of the tubes 12 such as at the level 33. Upon establishing gas flow upwardly through duct 16 and fluidization of the material 28, however, the upper level of the material will expand due to this fluidization so that the material is positioned throughout the entire length of the tube with the upper level then being disposed at 35.

Air is directed laterally over the tube bank and in order that the air will traverse the tubes twice the partition 34 is provided with this partition having its edge 36 spaced from wall 20 to provide passage 38 therebetween. Cold air is directed laterally across the lower portion of the tube bank 10 from the inlet duct 40, passes upwardly through passage 38 and then across the upper portion of the tube bank with the hot air leaving the heater through outlet duct 42.

Since the use of the fluidized medium within the tubes greatly increases the heat transfer rate from the hot combustion gases to the tube wall in order to increase the overall heat transfer of the air heater the outer surface of the tubes are provided with extended heat exchange surface, which as disclosed, may take the form of radial annular rings or disks 43 closely spaced throughout the length of the tubes and having their planes parallel to the air stream passing over the tubes, it being understood that this is merely illustrative and that other types of extended surface may, if desired, be employed. In this manner, i.e., by increasing the rate of heat transfer between the heating combustion gases and the tubes and providing extended heat exchange surface on the tubes and over which the heated air flows, the capacity of the gas to air air heater is substantially increased without increasing the physical size of the air heaters.

Fluidization of a discrete material of a particular particle size occurs within a certain range of velocity of the fluidizing gas. The lower limit of this velocity is that at which fluidization is initiated while the upper limit of the velocity is that at which the material is carried along with the gas or in the illustrative organization shown the body of material 28 or a substantial portion thereof is picked up and held against screen 32. Within these upper and lower velocity limits the discrete material will be in the fluidized state as this is known in the art of fludization. In order to increase the range of gas velocities through duct 18 with which the air heater of this invention may be employed dampers 44 are provided in duct 16 immediately upstream of the tube bundle. By means of these dampers combusion gas flow through a portion of the tubes of tube bank 10 may be effectively restricted or prevented with the portion of the tube bank thus restricted being adjustable by independently adjusting each of the dampers 44. Thus the tube bundle may be designed for the maximum gas velocity anticipated through duct 16 with all of the dampers 44 being in an open position when this maximum velocity prevails and the velocity of the gas through tubes 12 then being within the limits for the establishment of fluidization. As the gas velocity decreases and approaches the minimum velocity required for fluidization one of the dampers 44 such as the damper adjacent the wall 24 may be moved to its gas restricting position thereby effectively restricting the flow through the tubes directly above this damper resulting in increasing the gas velocity through the remaining tubes thus maintaining the velocity in these remaining tubes within the limits required for fluidization. As the velocity further decreases additional dampers may be closed with the minimum velocity through duct 16 at which the air heater may be operated being that which will fluidize the material in the tubes that remain unrestricted when all the dampers 44 are closed. Through this arrangement it will be evident that the range of gas velocity through duct 16 and at which the air heater may be operated is greatly increased over that which could be obtained without this control organization.

It should be noted that while very high heat transfer rates prevail between the fluidized medium and the fluidizing gas as well as between the heat transfer medium and the heat exchanger surface with which it is in contact this high heat transfer rate prevails only while the material is in a fluidized state and not when the material is not fluidized as when the gas velocity is above or below the limits which produce fluidization.

While the invention has been described wtih the combustion gases flowing through the tubes and the fluidized medium and the air flowing over the extended surface this is merely by way of explanation since the relationship may equally well be reversed.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

A combustion gas to air air heater comprising a bundle of laterally spaced vertically disposed tubes disposed generally in a number of rows and having their ends connected into a pair of spaced tube sheets, means for directing one of the gaseous mediums upwardly through said tubes, a discrete medium disposed in said tubes and fluidized by said upwardly flowing gas, screen means adjacent each end of said tubes retaining said discrete medium in said tubes while permitting said gas to flow therethrough, said tubes having radially extending fins thereon in spaced planes disposed transversely of the tube axis, wall members forming a plurality of interconnected passageways extending transversely of the tube bundle for directing the other gaseous medium across said bundle a plurality of times in parallel relation with the fins, and adjustable means disposed adjacent one of the tube ends operable to restrict flow through certain of the rows of tubes relative to other rows with said other rows remaining unobstructed to thereby regulate the flow through the unobstructed tubes to maintain the velocity thereof within the range required for fluidization.

References Cited in the file of this patent

UNITED STATES PATENTS

| | | |
|---|---|---|
| 1,716,333 | Vuilleumier | June 4, 1929 |
| 1,737,189 | Haber | Nov. 26, 1929 |
| 2,488,615 | Arnold | Nov. 22, 1949 |
| 2,550,722 | Rollman | May 1, 1951 |
| 2,594,471 | Marshall | Apr. 29, 1952 |
| 2,685,343 | Permann | Aug. 3, 1954 |
| 2,729,428 | Milmore | Jan. 3, 1956 |

FOREIGN PATENTS

| | | |
|---|---|---|
| 487,505 | Canada | Oct. 21, 1952 |